Figure 1:
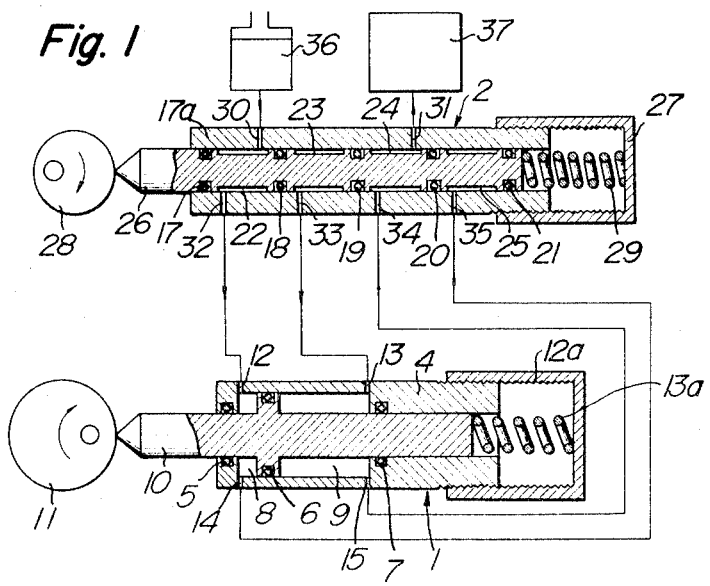

Sept. 20, 1966  KASUMI YOSHIDA ET AL  3,273,512
PUMP DEVICE FOR DELIVERING A MINUTE QUANTITY OF FLUID
Filed March 16, 1964  2 Sheets-Sheet 1

INVENTORS
Kasumi Yoshida
Mitsuo Shimada

By: Paul M. Craig, Jr.

ATTORNEYS

United States Patent Office 3,273,512
Patented Sept. 20, 1966

3,273,512
PUMP DEVICE FOR DELIVERING A MINUTE QUANTITY OF FLUID
Kasumi Yoshida, Mito-shi, and Mitsuo Shimada, Katsuta-shi, Japan, assignors to Hitachi, Ltd., Tokyo, Japan, a corporation of Japan
Filed Mar. 16 1964, Ser. No. 352,274
5 Claims. (Cl. 103—171)

This invention relates to a pump device and more particularly to such a device for delivering a minute quantity of liquid material.

In well known apparatus for automatically analysing aminoacids, in general, the aminoacids are separated by means of ion-exchange chromatography and quantitatively or qualitatively measured optically after developed utilizing ninhydrin reaction.

More specifically, after bringing a column filled with granular ion-exchange resin into equilibrium by passing buffer solution through said column by means of a pump device for delivering a minute quantity of the solution, a sample composed of various aminoacids is added into the column at the top thereof. Owing to difference in degree of dissociation of the aminoacids, some of them may be relatively highly adsorbed while the others may be rather slightly adsorbed by the ion-exchange resin. Thus the aminoacids can be separated from each other due to difference in moving velocity within the column so that the separated aminoacids are drained out succeedingly through the bottom of the column. Each of these effluents is perfectly developed by heating for a constant time after adding to it ninhydrin solution by means of another pump device for delivering a minute quantity of liquid. The effluent which has been developed is irradiated with light of a particular wave length and the light transmitted through the effluent is detected by means of an optical detector to indicate light absorption by the effluent. A series of signals each corresponding to light absorption of one of the effluents is applied to a recorder to obtain a chromatogram which bears peaks for respective aminoacids. Qualitative or quantitative analysis may be effected by means of such a chromatogram.

Such a pump device for delivering a minute quantity of liquid is the most important component of such an apparatus for automatically analysing aminoacids since output flow rate of the pump device must be maintained minute and uniform without being affected by variation in viscosity and pressure of the liquid and the chromatograph might be otherwise adversely affected to make qualitative or quantitative measurement difficult.

According to the present invention, there is provided an improved novel pump device for delivering a minute quantity of liquid from the above mentioned point of view.

It is a feature of the invention, therefore, to provide a pump device for delivering a minute and uniform quantity of liquid irrespective of viscosity and pressure of the liquid. Another feature of the invention is to provide such a device without intermission.

Figure 2:
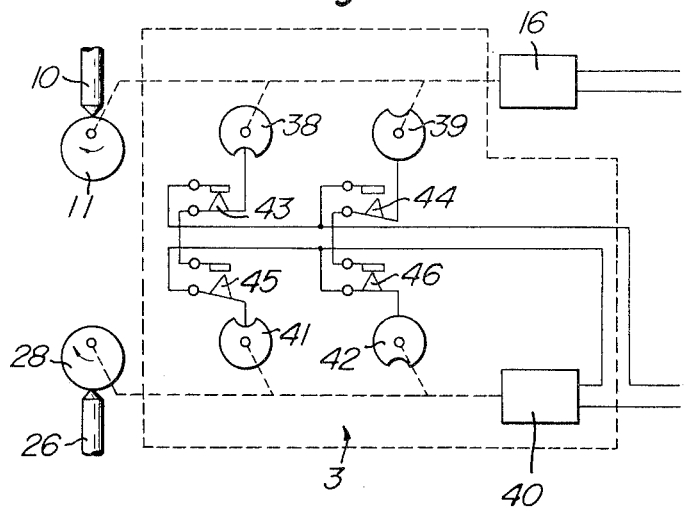
Figure 3:
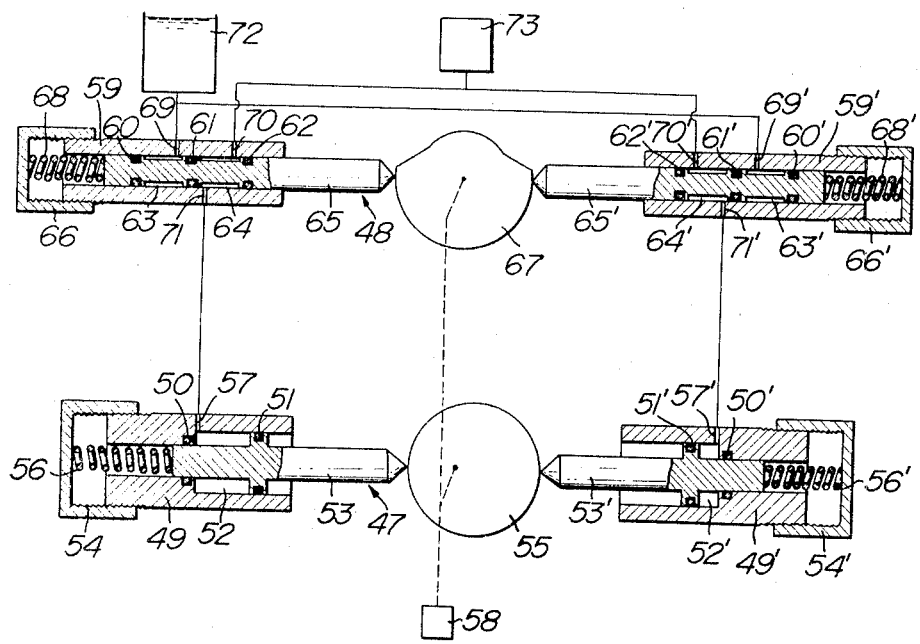

These and other objects and features of the present invention will be more apparent from the following specification taken in conjunction with the accompanying drawings which illustrate preferred embodiments thereof and in which:

FIG. 1 shows a side elevation in vertical section of an embodiment of a pump device for delivering a minute quantity of liquid according to the present invention;

FIG. 2 is a practical diagram for operation of a mechanism for changing connection of passageways utilized in the device shown in FIG. 1, and FIG. 3 shows a side elevation in vertical section of a further embodiment of a pump device for delivering a minute quantity of liquid according to the present invention. Referring to FIGS. 1 and 2 which illustrate an embodiment according to the present invention, a pump of reciprocating type generally represented by reference numeral 1 has in association therewith a mechanism generally represented by reference numeral 2 for changing connection of passageways and operating means generally represented by reference numeral 3 for operating the mechanism 2. The pump of reciprocating type 1 comprises a piston 10 inserted into a cylinder 4 through packings 5 to 7 to form two chambers 8 and 9. A compression spring 13a is arranged between one end of the piston 10 and a fixture 12a which is threadedly secured onto the cylinder 4 to tension the spring so that the other end of the piston 10 is forced to bear constantly against the periphery of a cam 11. The cam 11 is mounted eccentrically so that the piston may reciprocate with uniform velocity. The cylinder 4 is provided with inlets 12 and 13 and outlets 14 and 15 communicating with the chambers 8 and 9, respectively. The mechanism 2 for changing connection of passages has a cylinder 17a and a piston 26 which is slid into the cylinder 17a through packing 17 to 21 to form inlet passages 22 and 23 and outlet passages 24 and 25. A compression spring 29 is arranged between one end of the piston 26 and a fixture 27 which is threadedly secured onto the cylinder 17a to tension the spring 29 so that the other end of the piston 26 is forced by the spring to bear always against the periphery of a cam 28. The cylinder 17a is provided with an inlet entrance 30 which is alternately connected in fluid communicating relation to the inlet passages 22 and 23 and an outlet exit 31 which is alternately connected in fluid communicating relation to the outlet passages 24 and 25. The cylinder 17a is provided also with an inlet exit 32 and 33 which are connected always in fluid communicating relation to the inlet passages 22 and 23, respectively, and outlet entrances 34 and 35 which are connected always in fluid communicating relation to the outlet passages 24 and 25, respectively. While the inlet entrance 30 is connected to a fluid supply source 36, the outlet exit 31 is connected to a fluid receptacle 37. The inlet exit 32 is connected in fluid communicating relation to the inlet 12 and the inlet exit 33 is connected in fluid communicating relation to the inlet 13. The outlet exit 34 is connected to the outlet 15 and the outlet entrance 35 to the outlet 14, in fluid communicating relation. The operating means for operating the mechanism for changing connection of the passages comprises cams 38 and 39 which are connected with an electric motor 16 so that the cams 38 and 39 are rotated in synchronism with the cam 11. A cam 28 is connected with a high speed electric motor 40 with which cams 41 and 42 are connected to rotate in synchronism with the cam 28. Switches 43 to 46 bear against the surfaces of the cams 38, 39, 41 and 42, respectively.

Referring now to FIG. 3 illustrating another embodiment according to the present invention, a pump device of the invention comprises a pump of reciprocating type generally indicated by reference numeral 47 and a mechanism generally indicated by reference numeral 48 for changing connection of passages associated with the pump 47. The pump of reciprocating type 47 comprises pistons 53 and 53' which are inserted into cylinders 49 and 49', respectively, through packings 50, 50' and 51, 51', respectively to form two chambers 52 and 52', respectively. Compression springs 56 and 56' are arranged between respective ends of the pistons 53 and 53', respectively, and fixtures 54 and 54', respectively, which are threadedly secured onto the cylinders 49 and 49', respectively, to tension the springs 56 and 56' so that the other ends of the pistons 53 and 53', respectively, are forced to bear always against opposite peripheral portions of cam 55, respectively. The cylinders 49 and 49' are provided with common ports 57 and 57', respectively, which are connected to the chamber 52 and 52' in fluid communicating relations to alternately draw fluid in and send it out. The cam 55 is mounted eccentrically so that when one of the chambers 52 and 52' changes its volume from a maximum to a minimum change in the volume of the other chamber is interrupted simultaneously with the change of the volume of the one of the chambers, and that after the other of the chambers has been changed in its volume from a minimum to a maximum, change in the volume of the other of the chambers is again interrupted until the volume of the one of the chambers has been changed to its minimum.

In the mechanism 48 for changing connection of fluid passages comprises cylinders 59 and 59' in which pistons 65 and 65' are respectively inserted through packings 60, 61 and 62 and 60', 61' and 62', respectively to form inlet passages 63 and 63', respectively and outlet passages 64 and 64', respectively. Compression spring 68 and 68' are arranged between respective ends of the pistons 65 and 65' and fixtures 66 and 66', respectively, which are threadedly secured onto the cylinders 59 and 59' to tension the springs so that the other ends of the pistons 65 and 65' are forced to bear against opposite peripheral portions of a cam 67. While the cylinders 59 and 59' are provided with inlet entrances 69 and 69', respectively, which are always connected in fluid communicating relation to the inlet passages 63 and 63', respectively and with outlet exits 70 and 70', respectively, which are connected always in fluid communicating relation to the outlet passages 64 and 64', respectively, the cylinders 59 and 59' are provided also with a common channel 71 which is alternately connected in fluid communicating relation to the inlet passage 63 and the outlet passage 64 and with a common channel 71' which is alternately connected in fluid communicating relation to the inlet passage 63' and the outlet passages 64'. The inlet entrances 69 and 69' are connected in fluid communicating relation to a fluid supply source 72 and the outlet exits 70 and 70' are connected in fluid communicating relation to a fluid receptacle 73. The common channel 71 and 71' are connected in fluid communicating relation to the common ports 57 and 57', respectively. The cam 67 is mounted eccentrically so that the pistons may be reciprocated. The cam 67 is coupled with an electric motor 58 so that the cam 67 and the cam 55 are interlocked for synchronous rotation to form operating means for the mechanism for changing connection of the fluid passages.

With the above described construction, in operation of the embodiment of the invention shown in FIGS. 1 and 2, when the cam 11 is rotated uniformly at a low speed by the electric motor 16 of the pump of reciprocating type 1, the piston 10 travels uniformly to the right, viewed in FIGS. 1 and 2, until the cam 11 rotates through a half revolution. While the volume of the chamber 8 is changed progressively from a minimum to a maximum by the rightward movement of the piston 10, the volume of the chamber 9 is changed progressively from a maximum to a minimum. As a result, the chamber 8 is pressurized negatively so that the fluid from the supply source 36 are drawn into the chamber 8 through the inlet entrance 30, inlet passage 22, inlet exit 32 and the inlet port 12. At this instant, the output port 14 is not connected in fluid communicating relation to the outlet exit 31. On the other hand, the chamber 9 is pressurized so that the fluid within the chamber 9 is discharged into the fluid receptacle 37 through the outlet port 15, outlet entrance 34, outlet passage 24 and the outlet exit 31. At this instant, the inlet port 13 is not connected in fluid communicating relation to the inlet entrance 30. When the cam 11 has been rotated just through a half revolution, the volume of the chamber 8 reaches a maximum and that of the chamber 9 reaches a minimum. At this point, the cams 38 and 39 of the operating means 3 for the mechanism for changing connection of the passages has been rotated just through a half revolution to open the switch 43 and close the switch 44. Since the switch 45 is opened and the switch 46 is closed at this instant, the electric motor 40 is driven at high speed through a half revolution. As a result, the cams 41 and 42 are rotated through a half revolution to open the switch 45 and close the switch 46 and simultaneously the cam 28 in the mechanism 2 for changing connection of fluid passages is rotated through a half revolution. At this time the piston 26 is advanced promptly to the left, viewed in FIGS. 1 and 2, to connect the inlet entrance 30 to the inlet passage 23 and the outlet exit 31 to the outlet passage 25, in fluid communicating relation. Upon continued rotation of the cam 11 under such conditions, the piston 10 travels progressively to the left at uniform speed until the cam 11 makes just a complete revolution. By the leftward movement of the piston 10, the volume of the chamber 9 is changed progressively from a minimum to a maximum and at the same time the volume of the chamber 8 changes progressively from a maximum to a minimum. Thus the chamber 9 becomes negatively pressurized so that the fluid from the supply source 36 is drawn into the chamber 9 through the inlet entrance 30, inlet passage 23, inlet exit 33 and the inlet port 13. At this instant, the outlet port 15 is not connected in fluid communicating relation to the outlet exit 31. On the other hand, the chamber 8 is pressurized so that the fluid within the chamber 8 is discharged into the fluid receptacle 37 through the outlet port 14, outlet entrance 35, outlet passage 25 and the outlet exit 31. At this time, the inlet port 12 is not connected in fluid communicating relation to the inlet entrance 30. When the cam 11 has been rotated just through a complete revolution, the volume of the chamber 9 reaches a maximum and that of the chamber 8 reaches a minimum. The cams 38 and 39 of the operating means 3 for the mechanism for changing connection of the fluid passages has been rotated just through a complete revolution at this instant to close the switch 43 and open the switch 44. At this time, the switch 45 is closed and the switch 46 is opened so that the electric motor 40 makes a complete revolution at high speed. As a result, the cams 41 and 42 are rotated just through a complete revolution to open the switch 45 and close the switch 46, and the cam 28 of the mechanism 2 for changing connection of the fluid passages is rotated just through a complete revolution. The piston is advanced promptly to the right by the rotation of the cam 28 to connect the inlet entrance 30 to the inlet passage 22 and the outlet exit 31 to the outlet passage 24, in fluid communicating relation. After then operations exactly the same as described above will be repeated.

Now referring to FIG. 3, by uniform rotation at low speed of the electric motor 58 of the pump of reciprocating type 47, the piston 53 moves to the left uniformly until the cam 55 rotates through a half revolution. The movement of the piston 53 to the left causes the volume of the chamber 52 to change from a maximum to a minimum progressively.

Thus the fluid within the chamber 52 is pressurized so that the fluid is discharged into the fluid receptacle 73 through the common port 57, common port 71, outlet passage 64, and the outlet exit 70. On the other hand, the piston 53' remains immobile for a predetermined time interval at the same time as the piston 53 begins to move to the left. Since the cam 67 is connected with the electric motor 58 to interlock the cam 67 and the cam 55 to provide the operating means for operating the mechanism for changing connection of the passages, while the piston 53' rest for a predetermined time the piston 65' of the mechanism for changing connection of the passages is moved to the left by means of the cam 67 to connect the common port 71' to the inlet passage 63' in fluid communicating relation. The piston 53' moves to the left after it has rested for the predetermined time. By that movement the volume of the chamber 52' is changed from a minimum to a maximum. As a result, the chamber 52' is negatively pressurized so that fluid from the supply source 72 is drawn into the chamber 52' through the inlet entrance 69', inlet passage 63', and the common port 71'. After the volume of the chamber 52' has changed from a minimum to a maximum, the piston 53' rests for a predetermined time until the cam makes just a half revolution. While the piston 53' rests for the predetermined time, the piston 65' is moved to the left by the cam 67 to connect the common port 71' and the inlet passage 64' in fluid communicating relation. Under such condition, the piston 53' advances to the right uniformly until the cam 55 has made further a half revolution to complete one revolution. By the piston moving thus to the right, the volume of the chamber 52' is changed progressively from a maximum to a minimum. As a result, the fluid within the chamber 52' is pressurized so that the fluid is discharged into the fluid receptacle 73 through the common port 57', common port 71', outlet passage 64' and the outlet exit 70'. On the other hand, the piston 53 rests for a predetermined time at the same time as the piston 53' begins to move to the right. While the piston 53 rests for the predetermined time, the piston 65 is moved to the right by the cam 67 to connect the common port 71 and the inlet passage 63 in fluid communicating relation. After resting for the predetermined time the piston 53 begins to move to the right. The volume of the chamber 52 is changed from a minimum to a maximum by the piston 53 moving rightward. As a consequence, the fluid within the chamber 52 is negatively pressurized so that fluid from the supply source 72 is drawn into the chamber 52 through the inlet entrance 69, inlet passage 63, common port 71 and the common port 57. After the volume of the chamber 52 is changed from a minimum to a maximum, the piston 53 rests for a predetermined time until the cam 55 has made just a complete revolution. While the piston 53 rests for the predetermined time, the piston 65 is moved to the left by means of the cam 67 to connect the common port 71 and the outlet passage 64 in fluid communicating relation. After then operations exactly the same as described above are repeated.

As apparent from the foregoing detailed description, according to the present invention, pressurized fluid is delivered by means of a pump of reciprocating type, so that output flow rate of the fluid does not depend upon viscosity of the fluid and pressure variation at the outlet side to some extent. When volume of one of the chambers of the pump of reciprocating type, in which the volume of the other of the chambers changes from a minimum to a maximum as that of the one of the chambers changes from a maximum to a minimum, is changed from a maximum to a minimum, connection of fluid passages for the pump is changed by means of a mechanism for changing connection of the passages through operating means for operating the mechanism so that the one of the chambers is connected to a fluid supply source in fluid communicating relation and at the same time the other of the chambers is connected to a fluid receptacle in fluid communicating relation. Therefore, although outlet flow may be intermittent during such operation to change connection, such situation comes to an end in a very short time and thus the outlet flow can be maintained practically in a reproducible and exactly constant minute quantity. Moreover, the pump of reciprocating type according to the present invention is of such construction that when the volume of the one of the chambers changes from a maximum to a minimum the volume of the other of the chambers is kept unchanged for a predetermined time at the same time as the volume of the one of the chambers begins to change, and that while the volume of the one of the chambers changes progressively from a maximum to a minimum, connection of the fluid passages is so changed by means of the mechanism for changing connection of the fluid passages through the operating means for operating the mechanism that at the first unchanging duration of the volume of the other of the chambers the other of the chambers is connected to the fluid supply source in fluid communicating relation and at the second unchanging duration of the volume of the other of the chambers the other of the chambers is connected to the fluid receptacle in fluid communicating relation. As a result, the output flow is never interrupted and maintained in a reproducible and accurately constant minute quantity. Accordingly, the pump for delivering a minute quantity of liquid according to the present invention has a very great advantage when used in an automatic analysing apparatus for aminoacids.

It is to be understood, however, that the pump according to the present invention can be equally effectively employed in other automatic analysing apparatus than that for aminoacids.

What is claimed is:

1. A pump device for delivering a minute quantity of fluid comprising; a pump of reciprocating type having two chambers, a cylinder, a reciprocating piston in said cylinder controlling said chambers, means including a rotary cam member reciprocating said piston, said pump being of such construction that while volume of one of said chambers changes from a maximum to a minimum, volume of the other of said chambers changes from a minimum to a maximum; a mechanism for changing connection of fluid passages by means of which when the volume of the one of said chambers change from a maximum to a minimum it is connected to a fluid receptacle in fluid communicating relation and the other of said chambers is connected in fluid communicating relation to a fluid supply source; and means for operating said mechanism for changing connection of the fluid passages so that said fluid receptacle is connected in fluid communicating relation to one of said chambers, the volume of which has changed to a maximum, through said mechanism for changing connection of the fluid passages and said fluid supply source is connected in fluid communicating relation to the other of said chambers, the volume of which has changed to a minimum, when volume of either one of said chambers of said pump of reciprocating type has come to a maximum or a minimum.

2. A pump device for delivering a minute quantity of fluid comprising; a pump of reciprocating type having two chambers of changeable volume from maximum to minimum and vice-versa, said chambers being of such construction that when volume of one of said chambers changes from a maximum to a minimum, change in volume of the other of said chambers is interrupted to change for a predetermined time at the same time as the volume of the one of said chamber begins to change and the change in volume of the other of said chambers is again interrupted to change for a predetermined time after it has changed from a minimum to a maximum and until the volume of the one of said chambers changes to a minimum, a mechanism for changing connection of fluid passages to connect the one of said chambers and a fluid receptacle in fluid communicating relation and to connect the other of said chambers and a fluid supply source in fluid communicating relation when the volume of the one of said chambers in said pump of reciprocating type changes from a maximum to a minimum; and means for operating said mechanism for changing connection of the fluid passages so that said fluid supply source is connected to the one of said chambers in fluid communicating relation during first unchanging time interval of the volume of the other of said chambers through said mechanism for changing connection of the fluid passages and said fluid receptacle is connected to the one of said chambers in fluid communicating relation during second unchanging time interval of the volume of the other of said chambers through said mechanism for changing connection of the fluid passages, while the volume of the one of said chambers in said pump of reciprocating type changes from a maximum to a minimum.

3. A pump device for delivering a minute quantity of fluid comprising a pump mechanism of reciprocating type, a fluid supply source and a fluid receptacle, fluid passage means forming operative connections of said pump mechanism to said fluid supply source and to said fluid receptacle, said fluid passage means comprising a mechanism for controlling said connections, said pump mechanism comprising two working chambers for respectively effecting discharge and suction of fluid and also comprising means operable to alternately change the volumes of said working chambers at a uniform rate of speed, said last-named means comprising a rotary cam member and a piston actuated thereby, said mechanism for controlling said connections comprising a rotary cam means operable at a high speed, said last-named mechanism being effective to operatively connect said working chambers to said fluid receptacle upon the attainment of maximum volumes of said two working chambers, said last-named mechanism being also effective to operatively connect said working chambers to said fluid supply source when the volumes of said working chambers have, respectively, reached their minimum.

4. A pump device for delivering a minute quantity of fluid according to claim 3, wherein said pump mechanism includes means driven by said rotary cam member and effective to change the working volumes of said working chambers independently of each other, said rotary cam member having a cam face cooperating with said last-named means and effective to interrupt the change in the volume of one of the working chambers for a predetermined interval of time while the volume of the other of said working chambers is progressively changing from its maximum to its minimum at a uniform rate of speed, but simultaneously with the commencement of the change in the volume of said other of the working chambers, said cam face and said last-named means being also effective to again interrupt the change in the volume of said one of the working chambers for a predetermined interval of time from the time the volume of said one of the working chambers has completed the change from minimum to maximum till the time the volume of said other of the working chambers reaches its minimum, said mechanism for controlling said connections being actuated during the period that the changes in the volume of said working chambers are being interrupted, respectively.

5. A pump device for delivering a minute quantity of fluid according to claim 4, wherein said rotary cam member has a cam face effective to discharge fluid as controlled by the peripheral distance of said face corresponding to a half revolution of said cam.

References Cited by the Examiner

UNITED STATES PATENTS 1,470,426   10/1923   Danstrup _____ 103—227 X

MARK NEWMAN, *Primary Examiner.*

WARREN E. COLEMAN, *Examiner.*

HENRY F. RADUAZO, *Assistant Examiner.*